(12) United States Patent
Page et al.

(10) Patent No.: US 10,661,207 B2
(45) Date of Patent: *May 26, 2020

(54) FILTERING ASSEMBLY COMPRISING A FILTER CARTRIDGE

(71) Applicant: Cummins Filtration Sarl, Quimper (FR)

(72) Inventors: Emmanuel Page, Tremeoc (FR); Loïck Menez, Fouesnant (FR)

(73) Assignee: CUMMINS FILTRATION SARL, Quimper (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,851

(22) Filed: Mar. 8, 2018

(65) Prior Publication Data

US 2018/0193781 A1    Jul. 12, 2018

Related U.S. Application Data

(63) Continuation of application No. 15/123,126, filed as application No. PCT/EP2015/054112 on Feb. 27, 2015, now Pat. No. 9,943,790.

(30) Foreign Application Priority Data

Mar. 4, 2014    (FR) ..................... 14 51757

(51) Int. Cl.
*B01D 35/30* (2006.01)
*B01D 29/15* (2006.01)
(Continued)

(52) U.S. Cl.
CPC ............. *B01D 35/30* (2013.01); *B01D 29/15* (2013.01); *B01D 29/21* (2013.01); *B01D 35/005* (2013.01);
(Continued)

(58) Field of Classification Search
CPC ...... B01D 35/30; B01D 35/005; B01D 29/15; B01D 29/21; B01D 2201/291;
(Continued)

(56) References Cited

U.S. PATENT DOCUMENTS

| 9,943,790 B2* | 4/2018 | Page .................. B01D 35/30 |
| 2006/0006124 A1 | 1/2006 | Yates et al. |
| 2013/0056409 A1* | 3/2013 | Sawant ................ B01D 35/30 |
| | | 210/442 |

FOREIGN PATENT DOCUMENTS

| EP | 0 844 012 | 5/1998 |
| WO | WO-97/16235 | 5/1997 |

(Continued)

OTHER PUBLICATIONS

International Search Report and Written Opinion for PCT App. No. PCT/EP2015/054112 dated Jun. 18, 2015, 9 pages.
(Continued)

*Primary Examiner* — Madeline Gonzalez
(74) *Attorney, Agent, or Firm* — Foley & Lardner LLP

(57) ABSTRACT

The present invention relates to a filtering assembly for filtering at least one fluid flowing in particular in a hydraulic motor or device, comprising: —a filter body which comprises a vessel and a cover which are configured to engage with one another in order to enable the filter body to close, —a tube, in particular a central tube, inside the filter body extending along a longitudinal axis (X), —a removable filter cartridge which is housed in the filter body and includes an upper end plate, a lower end plate and a filter medium which extends between the upper end plate and the lower end plate, the filter cartridge having a tubular opening for surrounding the tube, characterized in that the cover has a circular rib which is formed such as to project into an inner space of the filter body, and in that the upper end plate has a circular edge
(Continued)

Figure 1:
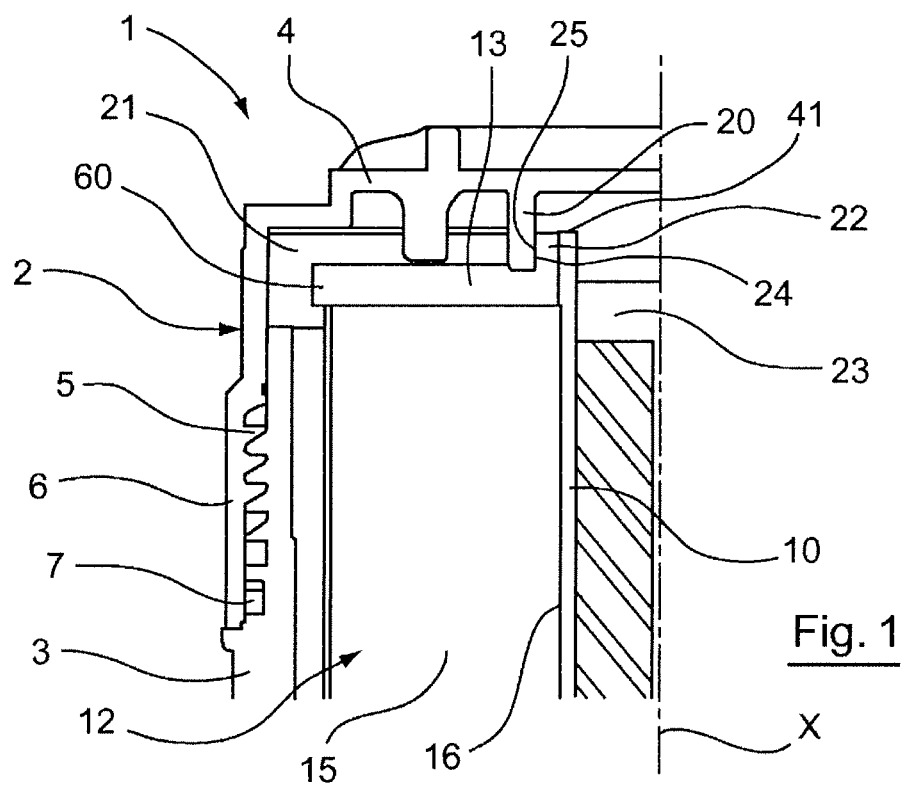

which is designed to sealingly engage radially and inwardly with said circular rib of the cover.

6 Claims, 5 Drawing Sheets

(51) Int. Cl.
*B01D 29/21* (2006.01)
*B01D 35/00* (2006.01)

(52) U.S. Cl.
CPC .. *B01D 2201/291* (2013.01); *B01D 2201/302* (2013.01); *B01D 2201/304* (2013.01); *B01D 2201/347* (2013.01)

(58) Field of Classification Search
CPC ........ B01D 2201/304; B01D 2201/302; B01D 2201/347
USPC .... 210/435, 450, 442, 444, 493.2, 437, 282, 210/455
See application file for complete search history.

(56) References Cited

FOREIGN PATENT DOCUMENTS

WO      WO 98/43723 A1      10/1998
WO      WO-2009/046019 A1      4/2009

OTHER PUBLICATIONS

Preliminary French Search Report for French App. No. 1451757 dated Nov. 10, 2014, 5 pages.

Written Opinion and Search Report Issued for French Patent Application No. 1759451, dated Apr. 24, 2018, including English language translation of written opinion, 10 pages.

* cited by examiner

FILTERING ASSEMBLY COMPRISING A FILTER CARTRIDGE

CROSS REFERENCE TO RELATED APPLICATIONS

The present application is a Continuation of U.S. application Ser. No. 15/123,126, filed Sep. 1, 2016, which is a National Stage of PCT Application No. PCT/EP2015/054112, filed Feb. 27, 2015, which claims priority to French Patent Application No. 1451757, filed Mar. 4, 2014. The contents of each of these applications are incorporated herein by reference in their entirety.

FIELD OF THE INVENTION

The invention relates to the field of the design and production of filtering assemblies used to filter the fluids circulating in motors or hydraulic equipment, the fluids essentially being oil or fuel oil.

Such filtering assemblies are generally made up of a filter body, comprising a tank and a cover, inside which a filter cartridge is positioned including a filter medium generally having a cylindrical shape, with a circular or ovoid cross-section, for example, surrounding a tubular opening and for example able to be made from paper, cardboard or felt, or another porous material, such as a synthetic or non-synthetic non-woven material. The filter cartridge also comprises two end plates delimiting the filter medium and allowing the filter cartridge to be installed inside the filter body.

Such a filter cartridge generally engages with a tube, in particular a central tube, which may or may not be secured to the end plates, and may or may not be secured to the filter cartridge, the outer diameter of which is close to the inner diameter of the tubular opening surrounded by the filter medium, in particular so as to limit the deformations of the medium under the effect of the pressure exerted inside the filtering assembly.

The end plates are formed by an upper end plate and a lower end plate. The role of the end plates is in particular to participate in sealing the filter cartridge and allowing the filter cartridge to be secured to the permanent part of the filtering assembly.

In this type of filtering assembly, the filter cartridge is generally removable, so as to allow it to be replaced with a new filter cartridge when it reaches the end of its life.

PRIOR ART

The known filter cartridges include the central tube, which is thrown away with the filter cartridge when it is replaced. There is a need to allow the central tube to be reused, whether it is installed permanently or reversibly in the filtering assembly.

Furthermore, the lower and/or upper end plates are generally glued onto the filter medium and/or the central tube. Furthermore, one or more sealing gaskets are added to engage with the end plates and the cover and/or the filter body so as to form tightness between the filter body and the filter cartridge at the end plates.

There is a need to limit the number of method steps necessary to manufacture a filter cartridge, and there is also a need to limit the number of parts necessary to produce the filtering assembly, and in particular the filter cartridge.

Furthermore, there is a need to assure the operator replacing the filter that he has in fact placed a new filter cartridge that is appropriate for the filtering assembly in question or that includes the appropriate filter medium for the use in question.

Lastly, there is a need to increase the space occupied in the filtering assembly by the filter medium.

AIMS OF THE INVENTION

The invention in particular aims to meet all or some of these needs.

In particular, according to at least one embodiment, one aim of the invention is to provide a filter cartridge with a limited number of parts.

Another aim of the invention is to provide a filter cartridge wherein the space occupied by the filter medium is increased relative to the cartridges of the prior art.

Another aim of the invention is to assure the operator performing the replacement of the filter cartridge that he has in fact placed an appropriate filter cartridge to replace the used filter cartridge.

Another aim of the invention is to ensure correct tightness between the cover and the filter cartridge, without adding additional sealing gaskets.

Another aim of the invention is to have a filtering assembly with a reusable central tube, so as to allow reduced costs and reduced material to be thrown away at the end of the life of the filter cartridge.

BRIEF DESCRIPTION OF THE INVENTION

In order to resolve all or part of the aims of the invention, the invention proposes a filtering assembly for filtering at least one fluid flowing in particular in a hydraulic motor or device, comprising:
  a filter body including a tank and a cover configured to engage with one another so as to enable the filter body to close,
  a tube, in particular a central tube, inside the filter body extending along a longitudinal axis (X),
  a removable filter cartridge, housed in the filter body and comprising an upper end plate, a lower end plate and a filter medium extending between the upper end plate and the lower end plate, the filter cartridge having a tubular opening for surrounding the tube.

According to the invention, the cover has a circular rib formed such as to project into an inner space of the filter body, and the upper end plate has a circular rim which is designed to sealingly engage radially and inwardly with the circular rib of the cover.

Owing to the invention, one has a relatively simple filter cartridge, the upper end plate of which forms a sealing gasket by cooperating with the circular rib formed on the cover.

Furthermore, the connection between the circular rib of the cover and the circular rim of the upper end plate being done radially inwardly relative to the rib and not radially outwardly relative thereto, the space occupied by the filter medium can be increased radially inwardly, which makes it possible to improve the filtration.

The circular rim may for example have an outer peripheral surface and the circular rib may have an inner peripheral surface, the circular rim and the circular rib engaging tightly by at least partial contact between the outer peripheral surface of the circular rim and the inner peripheral surface of the circular rib.

In that case, the outer peripheral surface of the rim may have a substantially frustoconical shape, and the inner peripheral surface of the rib may have a substantially frustoconical shape, the outer peripheral surface of the rim and the inner peripheral surface of the rib being configured to be substantially parallel to one another, so as to ensure tightness when they are in at least partial contact with one another.

This shape is advantageous to doing away with the machining allowances of the cover and the end plate. In fact, contact between two parallel surfaces is more easily created, even partially, when the surfaces are frustoconical, since there will easily be at least one contact circle between them making it possible to ensure tightness, even if the parallelism is not perfect, for example. In fact, even if it is not possible to determine exactly where there is a compression resulting in tightness between the respective contact surfaces of the rim and the rib, it is possible to obtain such tightness even if the taper is not exactly the same between the rib and that of the rim of the upper end plate.

The upper end plate may assume an annular shape and extend between the protruding circular rim and a circular outer edge, said upper end plate covering the filter medium over substantially the entire surface thereof. Alternatively, the circular rim may not be situated at an inner end of the annular shape of the upper end plate. In one particular embodiment, in fact, the upper end plate may still extend inside the circular rim, for example.

This annular shape of the upper end plate is generally planar aside from the rim inwardly provided, which allows a good expanse of the end plate above the filter medium.

The tube for example has an upper end configured to extend at least partially radially inward in contact with the rim of the upper end plate such that, once the filter cartridge is placed in the filter body, the rim of the upper end plate is radially compressed at least partially between the circular rib of the cover and the upper end of the tube.

Owing to that aspect of the invention, effective tightness is obtained between the cover and the upper end plate, as well as between the upper end plate and the tube, without adding additional sealing gaskets.

Furthermore, the compression done owing to the central tube can make it possible to improve the effectiveness of the tightness of the contact between the rim of the upper end plate and the circular rib of the cover.

In one particular embodiment, the circular rim of the upper end plate may have an upper end and the upper end of the tube may extend substantially to the upper end of the rim such that an inner peripheral surface of the circular rim is in contact with an outer surface of the upper end of the tube over substantially the entire height of the circular rim.

The tube, which has a general tubular shape, including at its end, can thus come into contact with the entire height of the rim of the upper end plate according to this embodiment, or over only part of it, seeking to improve the tightness and resistance of the rim, which can thus be made from a flexible material. The rigidity can then be imparted by the tube, made from metal or a rigid polymer material, such as PA 6.6 polyamide.

The filtering assembly may include a mistake-proofing system, making it possible to ensure the appropriateness of the filter cartridge placed during a maintenance operation or during manufacturing, with respect to the filtering assembly and/or use in question. The mistake-proofing members may be made advantageously on the cover on the one hand and on the upper end plate on the other hand.

The circular rib of the cover may thus include at least one notch-shaped cutout, formed over part of the height of the rib. The cutout advantageously constitutes a mistake-proofing means.

Owing to this embodiment, it is not possible to insert a different filter cartridge while ensuring tightness, which guarantees the operator that he has not made a mistake regarding the filter cartridge, or the contrary indicates that he has not placed the correct filter cartridge.

The circular rib may include at least one boss, also in particular forming a mistake-proofing means, present on an outer peripheral surface of said circular rib, said outer peripheral surface of the circular rib not being in contact with the rim of the upper end plate.

This feature also seeks to protect an operator replacing the filter cartridge from making an error regarding the replacement cartridge, the boss(es) preventing him from having a cartridge that would for example have an upper end plate rim positioned radially outwardly at the circular rib of the cover.

Alternatively or additionally, the cover may include at least one boss near the outer peripheral surface of the circular rib, in particular in the region of the cover extending substantially perpendicular to the longitudinal axis.

Such a boss may also play a mistake-proofing role in the event the operator seeks to position a filter cartridge not suitable for the filtering assembly.

The cover may include an additional outer rib, positioned outside the rib, concentrically, configured to extend to the upper end plate of the filter cartridge, when the filtering assembly is ready to be used. The upper end plate may include at least one blind hole tightly closed by the additional rib. The assembly of the additional outer rib and the blind hole may also act as a mistake-proofing means seeking to inform the operator of the correct or incorrect choice of the filter cartridge, whether initial or as replacement, that is inserted into the filtering assembly.

The cover may also have an additional inner rib, positioned inside the rib, concentrically, configured to extend above an upper end of the tube. Such an additional inner rib may extend in contact with an inner peripheral surface of the circular rim, for example in the extension of the tube along the longitudinal axis. The additional inner rib may have at least one cutout over part of its height, so as in particular to form a mistake-proofing means.

The upper end plate may be made from a polymer material chosen from the group made up of polyurethane, in particular flexible polyurethane, polyvinyl chloride (PVC), elastomer, a resin or a combination thereof, the polymer material being able to assume a foam or compact form, and have different hardnesses.

Thus, owing to the invention, it is possible to produce a filter cartridge with an upper end plate made from a flexible material forming a seal in itself and without adding a complementary sealing gasket, for example an O-ring or cylindrical seal.

The lower end plate may be made from the same material as the upper end plate or from a polymer such as polyethylene, polypropylene or others.

LIST OF FIGURES

Figure 2:
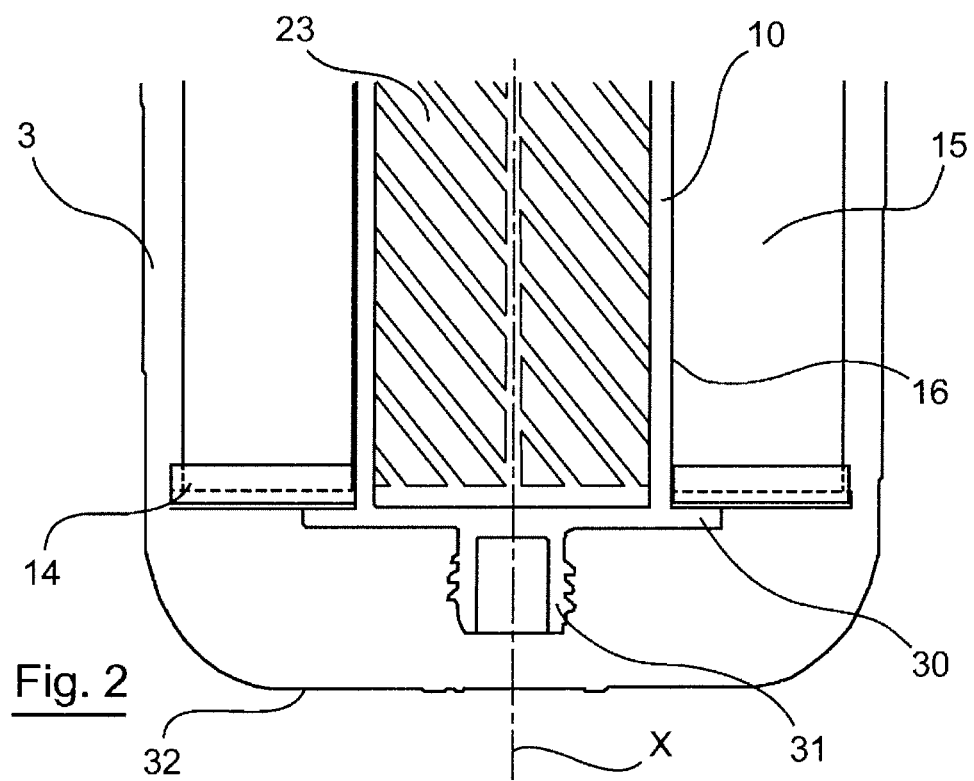
Figure 3:
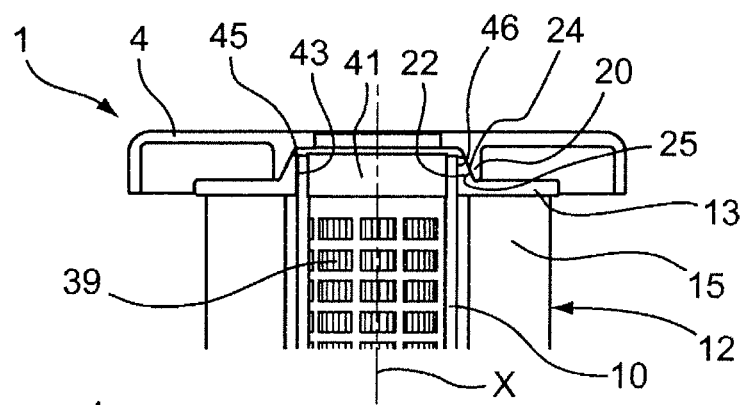
Figure 4:
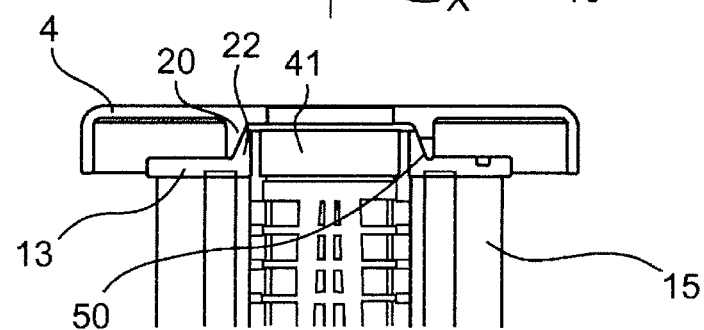
Figure 5:
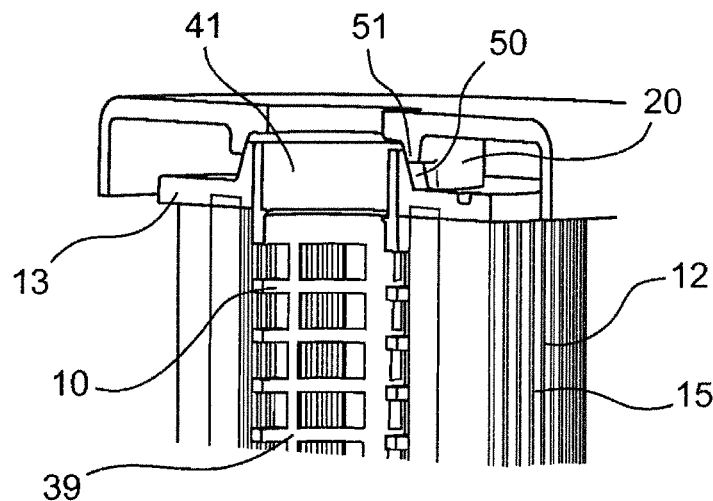
Figure 6:
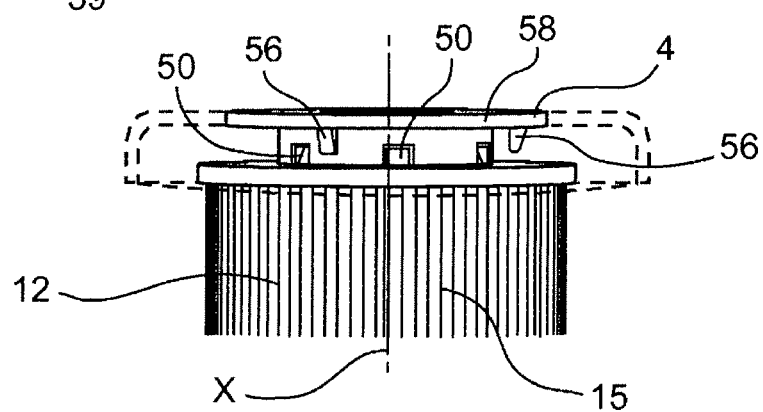
Figure 7:
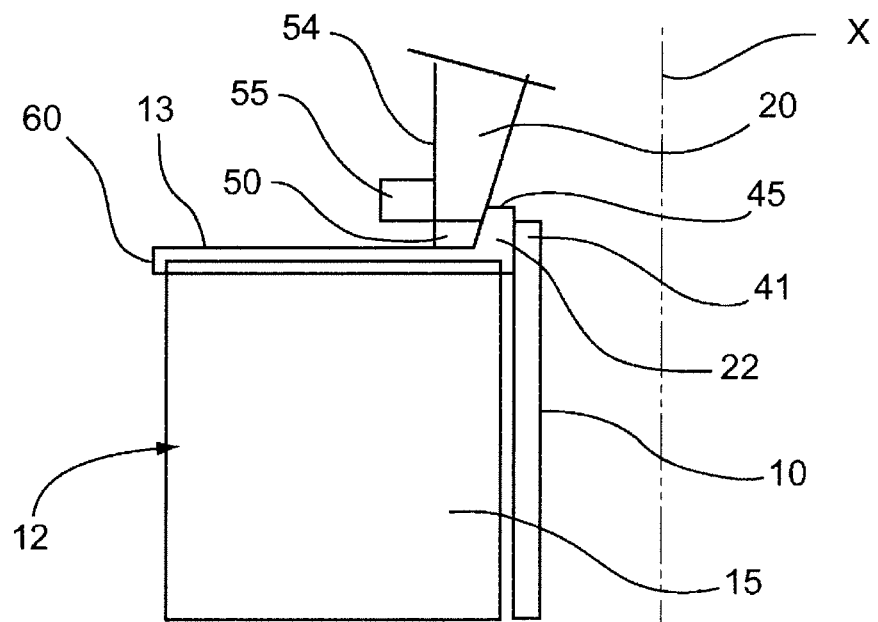
Figure 8:
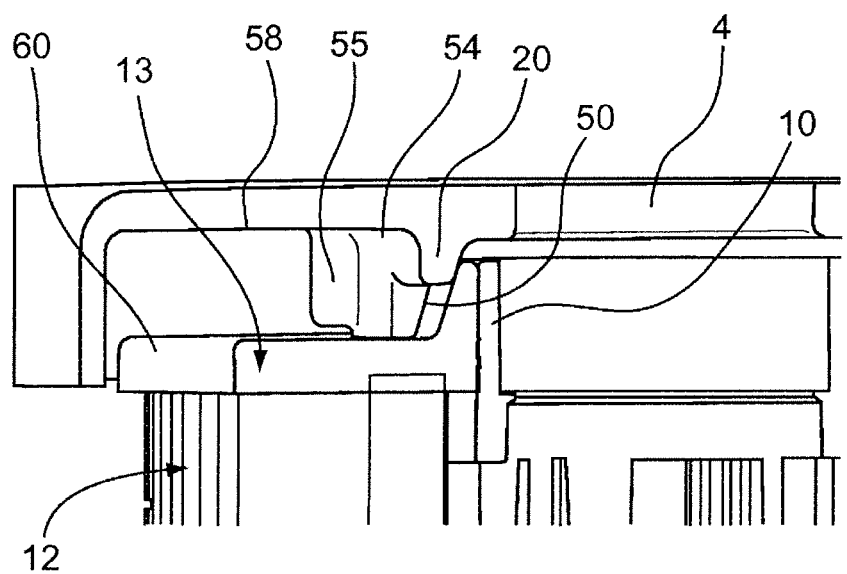
Figure 9:
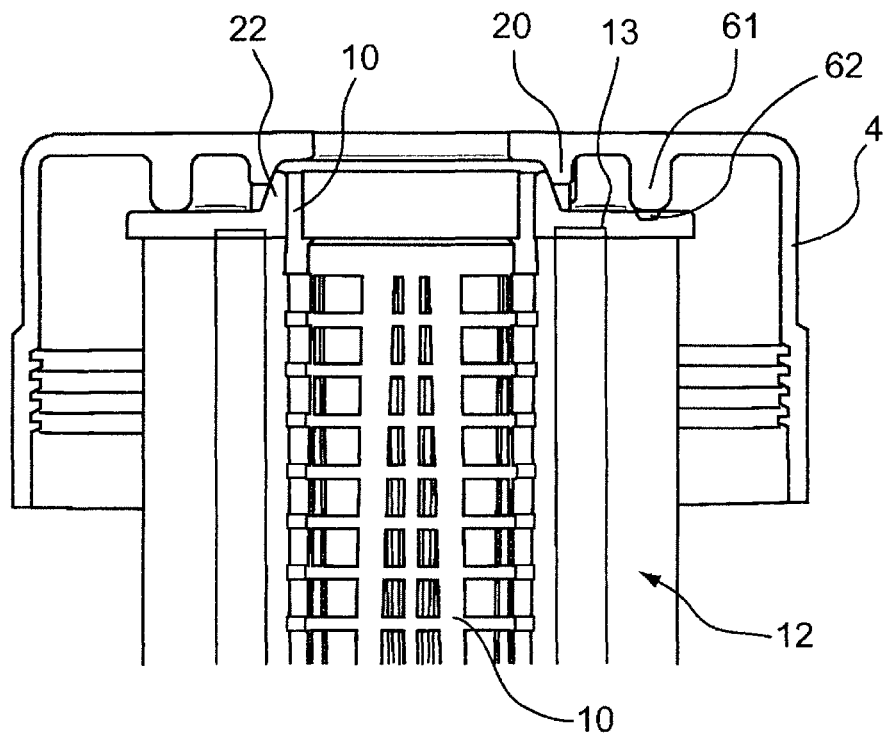
Figure 10:
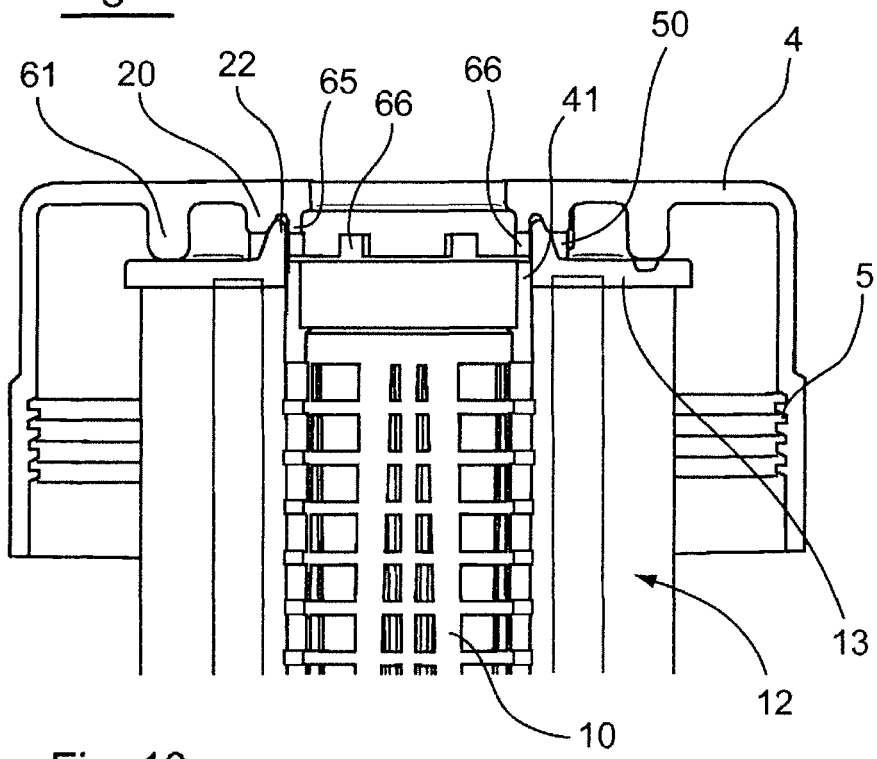
Figure 11:
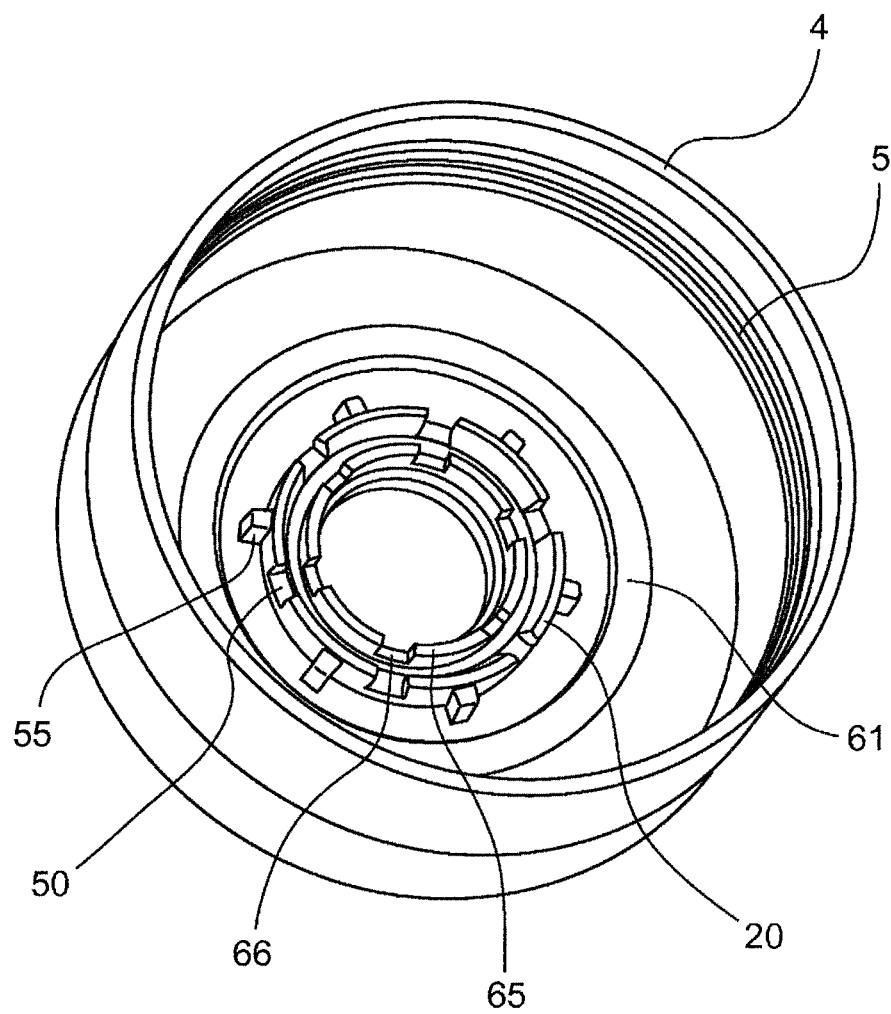

Other features and advantages of the invention will appear upon reading the following description of specific embodiments, provided as a mere illustrative and non-limiting example, in the appended drawings, in which:

FIG. 1 diagrammatically and partially shows a filtering assembly in longitudinal section, according to one embodiment of the invention, FIG. 2 diagrammatically and partially shows another part of the filtering assembly of FIG. 1, in longitudinal section, FIG. 3 shows a partial diagrammatic longitudinal sectional view of a filtering assembly according to another embodiment of the invention, FIG. 4 diagrammatically shows the filtering assembly of FIG. 3 in another longitudinal cutting plane, FIG. 5 diagrammatically and partially shows a longitudinal perspective sectional view of the filtering assembly of FIGS. 3 and 4, FIG. 6 diagrammatically and partially shows a perspective view of a portion of the cover of the filtering assembly of FIGS. 3 to 5, connected to the filter cartridge, FIG. 7 diagrammatically and partially shows a longitudinal sectional view of a filtering assembly according to another embodiment of the invention, FIG. 8 diagrammatically and partially shows a longitudinal sectional view of a filtering assembly according to another embodiment of the invention, FIG. 9 diagrammatically and partially shows a longitudinal sectional view of a filtering assembly according to another embodiment of the invention, FIG. 10 diagrammatically and partially shows a longitudinal sectional view of a filtering assembly according to another embodiment of the invention, and FIG. 11 diagrammatically shows a perspective view of the filtering assembly cover of FIG. 10 alone.

DETAILED DESCRIPTION OF THE INVENTION

The invention relates to a filtering assembly 1, a first embodiment of which is illustrated in FIGS. 1 and 2. Such a filtering assembly, used to filter at least one fluid, such as an oil or fuel oil, in particular flowing in a motor or a piece of hydraulic equipment, comprises a filter body 2 including a tank 3, also called shell, and a cover 4, also called head. The tank 3 and the cover 4 are configured to cooperate with one another so as to allow closing of the filter body 2, as illustrated in FIG. 1. In this example, the tank 3 and the cover 4 engage by screwing, both being provided with respective complementary threads 5 and 6. One or more sealing gaskets 7 are provided so as to ensure tight closing of the filter body 2.

The filtering assembly 1 further comprises a tube 10, made from a metal material or a polymer, central in this example, positioned inside the filter body 2 and extending along a longitudinal axis X, as illustrated.

The filtering assembly 1 also includes a removable filter cartridge 12, which is also housed in the filter body 2, inside the tank 3. The filter cartridge 12 has a general cylindrical shape, as illustrated. The filter cartridge 12 comprises an upper end plate 13, a lower end plate 14 and a filter medium 15 extending, as illustrated in FIGS. 1 and 2, between the upper end plate 13 and the lower end plate 14. As shown, the filter cartridge 12 has a tubular opening 16 to surround the tube 10.

According to the principle of the invention, the cover 4 of the filter body 2 has a circular rib 20 formed such as to project into an inner space 21 of the filter body 2. The upper end plate 13 in turn has a circular rim 22 designed to sealingly engage radially and inwardly with the circular rib 20 of the cover 4.

As shown in FIG. 1, and owing to the invention, it is not necessary to add a sealing gasket between the cover 4 and the filter cartridge 12. In fact, the radial cooperation between the rib 20 and the rim 22 ensures tightness between the inner space 21 of the filter body and the inner space 23 of the central tube, which forces the fluid to be filtered to pass through the filter medium 15 to reach the inner space 23 of the central tube 10 after filtration.

It must be noted that another advantage of the invention lies in the fact that the engagement between the upper end plate 13 and the cover 4 being done radially inwardly in the rib 20, the space occupied by the filter medium 15 may be radially increased, which makes it possible to improve the filtration.

As shown in FIG. 1, and in this embodiment, the circular rim 22 of the upper end plate 13 has an outer peripheral surface 24. The circular rib 20 of the cover 4 has an inner peripheral surface 25. The circular rim 22 and the circular rib 20 engage tightly by at least partial contact between the outer peripheral surface 24 of the circular rim 22 and the inner peripheral surface 25 of the circular rib 20.

As illustrated in FIG. 2, the tube 10 extends inward in contact with the filter medium 15 of the filter cartridge 12. Its shape is substantially cylindrical around a longitudinal axis X and ends in the lower portion, in the illustrated example, with a circular surface 30, substantially perpendicular to the longitudinal axis X. This surface 30 comes into lower contact with the lower end plate 14 and is provided with reversible securing means 31 with the complementary means of the filter body, not shown in FIG. 2 and which in turn for example extend from the bottom 32 of the tank 3.

During the replacement of the filter cartridge 12, it suffices for the operator to remove the cover 2 by unscrewing, then to separate the reversible securing means 31 and remove the assembly of the tube 10 and the filter cartridge 12. Lastly, the operator separates the tube 10 from the filter cartridge 12, which will be thrown away, while the tube 10 can be reused and reinstalled with a new cartridge inside the filter body, before closing the cover 2.

FIGS. 3 to 6 show another embodiment of a filter assembly according to the invention. In these figures, only a portion of the cover 4 of the filtering assembly is illustrated with part of the filter cartridge 12 and the tube 10.

In this example, the outer peripheral surface 24 of the circular rim 22 of the upper end plate 13 has a substantially frustoconical shape, as shown. Furthermore, the inner peripheral surface 25 of the circular rib 20 of the cover 4 has a substantially frustoconical shape. The outer peripheral surface 24 of the rim 22 and inner peripheral surface 25 of the rib 20 are configured in this example to be substantially parallel to one another, as shown, so as to ensure tightness when they are in at least partial contact with one another.

Such a frustoconical shape makes it possible to obtain, with a certain allowance in the machining of the cover or the upper end plate, a guaranteed tightness, at least over a contact circle between the outer peripheral surface 25 of the rim 22 and inner peripheral surface 24 of the rib 20.

Furthermore, in this example, one can see the openwork shape of the central portion 39 of the tube 10 and allow the passage of filtered fluid in the inner space 23 of the tube 10.

It should be noted that the tube 10 has a generally cylindrical shape with the openwork central portion 39 at the portion extending against the filter medium 15. The tube 10 ends upwardly by a cylindrical and solid upper end 41. In the example of FIGS. 1 and 2 as in the example of FIGS. 3 to 6, the upper end 41 of the tube 10 is configured to extend at least partially radially inward in contact with the circular rim 22 of the upper end plate 13, more specifically in contact with an inner peripheral surface 43 of the circular rim 22 of the end plate 13. Thus, once the filter cartridge 12 is placed in the filter body 2, the rim 22 of the upper end plate 13 is radially compressed at least partially between the circular rib 20 of the cover 4 and the upper end 41 of the tube 10.

In the examples of FIGS. 1 to 6, this upper end 41 of the tube extends substantially to the upper end 45 of the rim 22, such that an inner peripheral surface 43 of the circular rim 22 is in contact with an outer surface 46 of the upper end 41 of the tube 10 over substantially the entire height of the circular rim 22.

In FIGS. 3 to 6, the circular rim 22 has an outward frustoconical shape, while the inner peripheral surface 43 is substantially cylindrical, being parallel to the outer surface 46 of the upper end 41 of the tube 10.

In the example illustrated in FIGS. 3 to 6, the circular rib 20 of the cover 4 includes, as shown in particular in FIGS. 4 and 5, at least one notch-shaped cutout 50, formed over part of the height of the rib 20 in the illustrated example. In this example, as shown, the tightness between the upper end plate 13 and the rib 20 is nevertheless ensured owing to a contact zone 51 in the upper portion of the rib 20 at the cutout 50, as shown in particular in FIG. 4 or 5.

Thus, it is not possible to insert a filter cartridge 12 that is different while ensuring tightness, due to the presence of the cutout(s) 50, which guarantees that the operator has not made a mistake in the filter cartridge 12. Such a cutout or cutouts 50 can, on the contrary, inform him that he has not placed the correct filter cartridge if the tightness is not attained.

In the illustrated example, and as illustrated in FIG. 6, the cover 4 (part of which is shown diagrammatically in dotted lines in this figure) also includes at least one, in this case a plurality of bosses 56 near the outer peripheral surface 54 of the circular rib, in particular in a region 58 of the cover 4 extending substantially perpendicular to the longitudinal axis X. Such bosses 56 also play a mistake-proofing role in the event the operator seeks to position a filter cartridge that is not appropriate for the filtering assembly or for the use in question.

FIG. 7 very diagrammatically shows another embodiment according to the invention, in which the circular rib 20 further includes at least one boss 55, present on the outer peripheral surface 54 of the circular rib 20. This outer peripheral surface 54 of the circular rib 20 is not, as shown, in contact with the rim 22 of the upper end plate 13. The presence of the boss(es) 55 is also advantageous, like the cutout(s) 50 also present in this embodiment, to assure an operator changing the filter cartridge that he is not making a mistake regarding the filter cartridge, so as in particular to avoid the risk of damaging the injection system for diesel fuel, for example. In fact, the boss(es) 55 for example prevent the operator from placing a filter cartridge with an upper end plate rim, or a seal, positioned radially outwardly with respect to the circular rib of the cover. In that case, the seal or the end plate abuts against the boss(es) 55, preventing correct positioning of the filter cartridge inside the filter body, thus informing the operator of the filter cartridge error.

Also in this embodiment, the upper end 41 of the tube 10 does not extend fully to the upper end 45 of the circular rim 22.

In the example illustrated in FIG. 8, the bosses 55 extend from the region 58 of the cover 4 over substantially the entire height of the rib 20.

In the example illustrated in FIG. 9, the cover 4 includes an additional outer rib 61, positioned outside the rib 20, concentrically, configured to extend up to the upper end plate 13 of the filter cartridge 12, when the filtering assembly 1 is ready to be used. The upper end plate 13 in turn includes at least one blind hole 62 closed tightly by the additional outer rib 61. The assembly of the additional outer rib 61 and the blind hole 62 can also act as a mistake-proofing member seeking to inform the operator whether the filter cartridge 12, whether an initial filter or a replacement, that is inserted into the filtering assembly 1 has been chosen correctly.

FIGS. 10 and 11 show another embodiment, in which the cover 4 includes an additional rib 65 positioned inside the circular rib 20, concentrically, configured to extend above an upper end of the tube 10. Such an additional inner rib 65 extends in contact with an inner peripheral surface 43 of the circular rim 22, for example in the extension of the tube 10 along the longitudinal axis X, as shown in FIG. 10. The additional inner rib 65 could have at least one cutout 66, in particular a plurality of cutouts 66, in the form of notches, over part of its height, in particular in order to form a mistake-proofing member.

In all of the described embodiments, means are of course provided on the one hand to bring the fluid to be filtered inside the cartridge, and on the other hand to allow the filtered fluid to leave the cartridge. Different embodiments of intake and/or outgoing conduits may be implemented without going beyond the scope of the invention. Furthermore, an emptying system may also be provided if applicable.

In the illustrated examples, the upper end plate 13 has a generally annular shape extending between the protruding circular rim 22 and a circular outer edge 60, the upper end plate 13 covering, as illustrated, the filter medium 15 over substantially the entire surface thereof.

In one alternative that is not illustrated, the circular rim 22 may not be situated at an inner end of the annular shape of the upper end plate 13, but the upper end plate 13 could also extend radially inside the circular rim 22, for example.

The material forming the upper end plate 13 may be chosen from the group made up of polyurethane, in particular a flexible and compressible polyurethane, resin, an elastomer, polyvinyl chloride.

The flexible material with which the upper end plate 13 is made in particular makes it possible to produce the tightness between the rim 22 and the rib 20, without adding an additional sealing gasket, in particular an O-ring or a cylindrical seal.

The lower end plate 14 in turn may be made from the same polymer material as the upper end plate 13 or a polymer material chosen from the group consisting of polyamide, polypropylene, inter alia.

The material of the cover, in particular of the rib 20, may be made from a polymer material or aluminum foundry, or steel or others.

In the entire description, the expressions "including a" and "comprising a" must be understood as being synonymous with the expressions "including at least one" and "comprising at least one", respectively, unless otherwise specified.

The invention claimed is:

1. A filter apparatus for filtering a fluid, comprising:
 a filter cartridge removably sized for housing in a filter body and comprising an upper end plate, a lower end plate and a filter medium extending between the upper end plate and the lower end plate, the upper end plate having a circular rim configured to sealingly engage radially and inwardly with a circular rib of a cover of the filter body, the filter cartridge defining a tubular opening; and a tube positioned inside the filter body, the tube extending along a longitudinal axis of the filter body at least partially within the tubular opening of the filter cartridge, the tube having an upper end configured to extend at least partially radially inward in contact with the circular rim of the upper end plate such that, when the filter cartridge is placed in the filter body, the circular rim of the upper end plate is radially compressed at least partially between the circular rib of the cover and the upper end of the tube, wherein the circular rim of the upper end plate includes an upper end, the upper end of the tube extending substantially to the upper end of the circular rim such that an inner peripheral surface of the circular rim is in contact with an outer surface of the upper end of the tube over substantially an entire height of the circular rim, and wherein the circular rib includes at least one boss presenting on an outer peripheral surface of the circular rib, the outer peripheral surface of the circular rib not being in contact with the circular rim of the upper end plate.

2. The filter apparatus according to claim 1, wherein the upper end plate is made from a polymer material selected from the group made up of polyurethane, polyvinyl chloride, elastomer, a resin or a combination thereof.

3. The filter apparatus according to claim 1, wherein the upper end plate is made from a flexible polyurethane.

4. The filter apparatus according to claim 1, wherein the upper end plate has an annular shape and extends between the circular rim and a circular outer edge, the upper end plate covering the filter medium over substantially an entire upper surface of the filter medium.

5. The filter apparatus according to claim 1, wherein an outer peripheral surface of the circular rim of the upper end plate has a substantially frustoconical shape.

6. The filter apparatus according to claim 5, wherein the outer peripheral surface of the circular rim is configured to be substantially parallel to an inner peripheral surface of the rib, so as to ensure tightness when the circular rim and the rib are in at least partial contact with one another.

* * * * *